R. B. WEAVER.
SPIRAL GEAR CUTTER.
APPLICATION FILED OCT. 28, 1914.
1,168,356.
Patented Jan. 18, 1916.
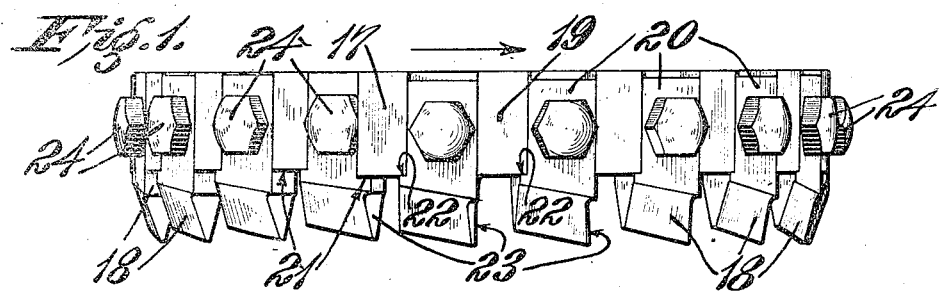
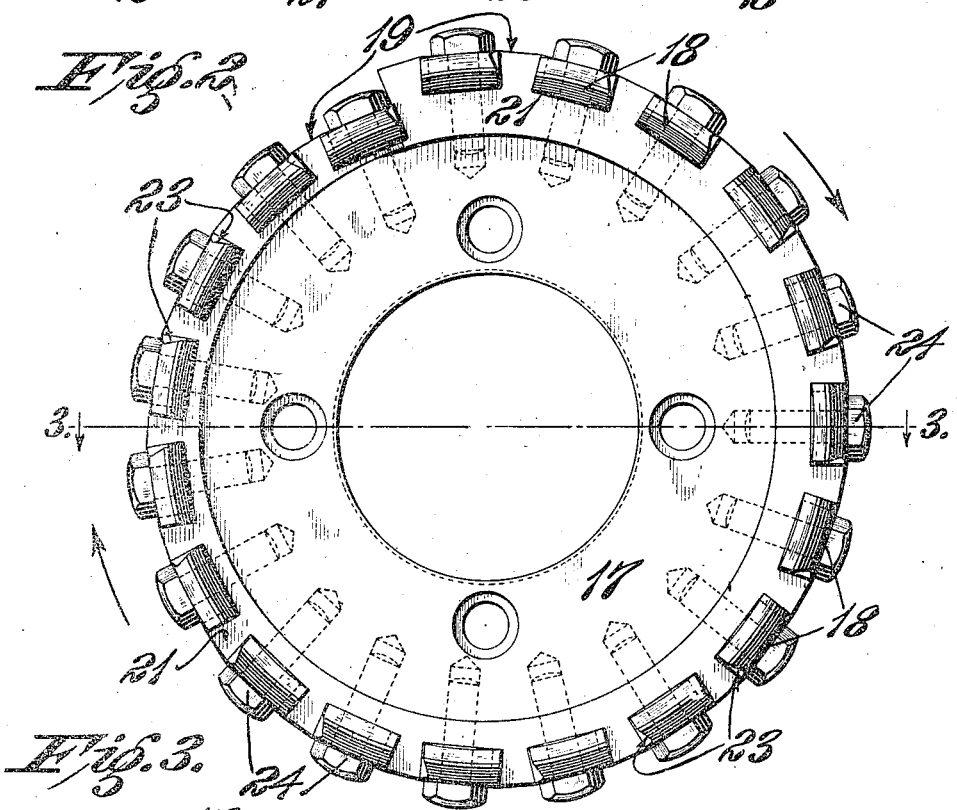
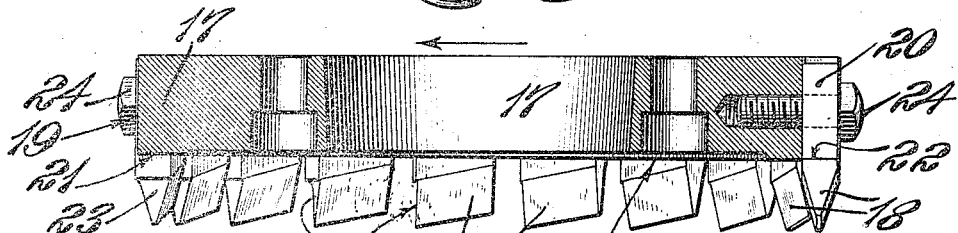

UNITED STATES PATENT OFFICE.

ROBERT B. WEAVER, OF DETROIT, MICHIGAN, ASSIGNOR TO THE TIMKEN-DETROIT AXLE COMPANY, OF DETROIT, MICHIGAN, A CORPORATION OF OHIO.

SPIRAL-GEAR CUTTER.

1,168,356.  Specification of Letters Patent.  Patented Jan. 18, 1916.

Application filed October 28, 1914. Serial No. 868,924.

*To all whom it may concern:*

Be it known that I, ROBERT B. WEAVER, a citizen of the United States, and a resident of the city of Detroit, in the county of Wayne and State of Michigan, have invented a new and useful Improvement in Spiral-Gear Cutters, of which the following is a specification.

This invention relates to a toothed cutting head or cutter for cutting spiral and helical bevel gears, circular and bevel worm gears, spiral and helical crown gears, and the like. The cutter is particularly adapted for use in spiral bevel gear cutting machines similar to that shown and described in my application for Letters Patent of the United States, Ser. No. 831,412.

The object of the invention is to provide a cutter with a series of cutting teeth arranged in a spiral curve.

Further objects of the invention are the improvements in the construction of the cutter head and cutting teeth shown in the accompanying drawings and hereinafter described.

In the drawings, in which like characters designate like parts in the several views, Figure 1 is a top side view of a cutter embodying the invention; Fig. 2 is a face view thereof; and Fig. 3 is a cross-section on the line 3—3 in Fig. 2, looking in the direction of the arrows.

The cutter comprises a disk-like face plate 17, and a series of cutting teeth 18 secured thereto and axially disposed around it in a spiral of changing radius, with their cutting edges projecting from the face of the plate 17 and disposed symmetrically with respect to an advancing spiral through their points. The face plate 17 has its periphery 19 shaped to conform to a spiral of changing radius, and notched to receive the shanks 20 of the cutting teeth. The face of the plate 17 has an annular flange 21 around it, the flange 21 varying in height, and gradually diminishing in height from a maximum opposite the greatest radius of the disk to a minimum opposite the least radius of the disk. The teeth have shoulders 22 at the inner ends of the shanks, and these shoulders bear against the face of the flange 21 and position the cutting edges 23 of the teeth at a fixed distance therefrom. Screws 24 secure the teeth in the notches of the face plate. The body portion of the cutting end of the tooth is of the same cross-sectional shape as the cutting edge thereof, and is backed off and curved sidewise to follow in the path of the cut made thereby, as shown. The change in the radius of the spiral periphery 19 of the plate, the change in height of the flange 21, and the shape of the cutting edges 22 of the teeth, may be modified to suit the pitch, depth of cut, and shape of the gear to be operated upon. It is evident that changes in the constructional details of the face plate and teeth may be made.

The invention is not restricted to the forms and arrangements shown in the drawings except as the scope of the appended claims requires. Although the cutter is described and claimed for shaping spiral gear teeth, its use is not restricted thereto.

I claim the following as my invention:

1. A cutter for shaping spiral gear teeth, said cutter comprising a face plate having a spiral periphery, an axially projecting flange around said face plate, said flange varying in height, and cutting teeth spaced around said flange and secured thereto.

2. A cutter for shaping spiral gear teeth, said cutter comprising a face plate having a spiral edge portion, and cutting teeth secured to said face plate, said cutting teeth having shoulders bearing against said spiral edge portion.

3. A cutter for shaping spiral gear teeth, said cutter comprising a face plate and suitably shaped cutting teeth arranged in series around its edge, and secured thereto, said face plate having a flange on its face with a spiral edge, and said teeth having shoulders bearing against the spiral edge of said flange.

Signed at Detroit, Mich., this 24th day of October, 1914.

ROBERT B. WEAVER.

Witnesses:
  LESLIE WILLIAMS,
  E. M. SWEETZER.